United States Patent [19]
Shoji et al.

[11] Patent Number: 6,011,549
[45] Date of Patent: *Jan. 4, 2000

[54] METHOD AND APPARATUS FOR SMOOTH SCROLLING OF TEXT USING WINDOW

[75] Inventors: Wataru Shoji; Daisuke Tabuchi; Ichiro Nakajima, all of Tokyo, Japan

[73] Assignee: Sofmap Future Design, Inc., Tokyo, Japan

[ * ] Notice: This patent is subject to a terminal disclaimer.

[21] Appl. No.: 09/128,054

[22] Filed: Aug. 3, 1998

Related U.S. Application Data

[63] Continuation of application No. 08/680,049, Jul. 12, 1996, Pat. No. 5,877,761.

[51] Int. Cl.$^7$ ........................................... G06F 3/14
[52] U.S. Cl. ............................ 345/341; 345/123
[58] Field of Search .................... 345/112, 123, 345/124, 341

[56] References Cited

U.S. PATENT DOCUMENTS

| | | | |
|---|---|---|---|
| 4,714,919 | 12/1987 | Foster | 345/123 |
| 4,922,238 | 5/1990 | Aoki et al. | 345/123 |
| 5,263,134 | 11/1993 | Paal et al. | 345/341 |
| 5,333,247 | 7/1994 | Gest et al. | 345/123 X |
| 5,877,761 | 3/1999 | Shoji et al. | 345/341 |

OTHER PUBLICATIONS

Foley et al., "Computer Graphics: Principles and Practices" (Second Edition), Addison–Wesley Publishing Company, 1990, pp 443–444.

*Primary Examiner*—John E. Breene
*Assistant Examiner*—Chadwick A. Jackson
*Attorney, Agent, or Firm*—H.C. Chan

[57] ABSTRACT

Text image on a monitor can be scrolled pixel-by-pixel instead of line-by-line or character-by-character. An application window (for showing images generated by an application) and a child window are generated. The text image is drawn on the child window instead of on the application window. The size of the application window is smaller than the child window. Only the portion of the child window overlapping the application window is displayed by a computer screen. If a user desires scrolling, the child window is moved, a pixel at a time, in a direction corresponding to the direction of scrolling. When a full line or a full character is scrolled, the child window clears itself and returns to its original position. At the same time, the text image is scrolled one line or one character on the child window so as to match the pixel-based scrolling. As a result, the user sees a smooth scrolling of a text image.

5 Claims, 3 Drawing Sheets

METHOD AND APPARATUS FOR SMOOTH SCROLLING OF TEXT USING WINDOW

CROSS REFERENCE TO RELATED APPLICATIONS

This application is a continuation of Application having Ser. No. 08/680,049 filed on Jul. 12, 1996 now U.S. Pat. No. 5,877,761.

FIELD OF THE INVENTION

The present invention relates to displaying text images using a computer, and more particularly to methods and systems for improving the resolution of scrolling text images displayed on a computer monitor.

BACKGROUND OF THE INVENTION

When computers were first developed, they were very expensive. As a result, only large research institutions and corporations could afford to buy them. Consequently, computers were primarily being used to solve scientific problems (e.g., simulating the behavior of fluid) and support business operations of large corporations (e.g., processing accounting and customer records of insurance companies) The software programs designed for these purposes communicate with users using numbers and text. The users of these software programs were technically trained, and were comfortable in such environment. Thus, there were little needs for these program to present information in graphic or image forms During the past few years, the price of computers decreased drastically. Computers are now purchased by many homes and small businesses. The users are more comfortable in dealing with graphic images (such as bitmap images, vector images and video). As a result, computer environments involving graphic user interface (such as Microsoft Corporation's Windows and Macintosh computer's System 7 operating system) become popular. Consequently, most new computer programs are designed to operate in these environments. For example, many widely used word processor programs have been ported from their text-based environment (operating under Microsoft's MS-DOS) to the graphic-based Windows environment. One advantage of using word processor under this new environment is that the image of text ("text image") in a page on a computer monitor has the same appearance as the page printed out of a printer Thus, the user can see the appearance of a document (and make revisions if the appearance needs to be changed) prior to its printing.

An essential tool in manipulating graphic and text images is scrolling. The need for scrolling arises when the size of a window displaying a graphic/text image is smaller than the full size of the image. Thus, the window can display a portion of the image only. In order to display other portions of the image, a user can "scroll" the image. Typically, the user uses a cursor to indicate the direction of scrolling. The position of the cursor is controlled by a mouse (or other pointing devices) held by the user. The location of the cursor is delivered to the operating system and the application software (e.g., word processor program) controlling the graphic/text image. The images on most display devices need to be refreshed (i.e., re-drawn) periodically, e.g., sixty times per second. During scrolling, the refreshed images would show a series of shifted images depicting movements of the graphic/text image. The operating system and the application software use the position of the cursor to determine how the series of images should be drawn.

An important factor in scrolling is its granularity, i.e., the smallest number of pixels (picture elements) in each scrolling operation. It is found that prior art scrolling of text images is line-by-line and character-by-character, i.e., the minimum scrolling distance is a line or a character. Thus, the granularity is very rough (i.e., a large number of pixels in each scrolling). The result is that scrolling of text images is jerky and unpleasant to watch.

SUMMARY OF THE INVENTION

The present invention allows a computer user to scroll a text image pixel-by-pixel instead of line-by-line or character-by-character. A pixel is the smallest unit of display. Thus, this scrolling method represents the finest granularity in scrolling text images.

The present invention involves creating a child window associated with a window generated by an application used by a user (the "application window"). The text image is drawn on the child window instead of the application window. The size of the child window is larger than the application window. However, only the portion of the child window overlapping the application window is displayed by a computer screen. If the user desires scrolling, the child window is moved, a pixel at a time, in a direction corresponding to the direction of scrolling. As a result, the user sees scrolling at a pixel granularity. When a full line or a full character is scrolled, the child window clears itself and returns to its original position. At the same time, the text image is scrolled one line or one character on the child window so as to match the pixel-based scrolling. The child window is moved again pixel-by-pixel. As a result, the user sees a smooth (pixel granularity) scrolling of a text image.

These and other features and advantages can be understood from the following detailed description of the invention together with the accompanying drawings.

DETAILED DESCRIPTION OF THE INVENTION

Figure 1A:
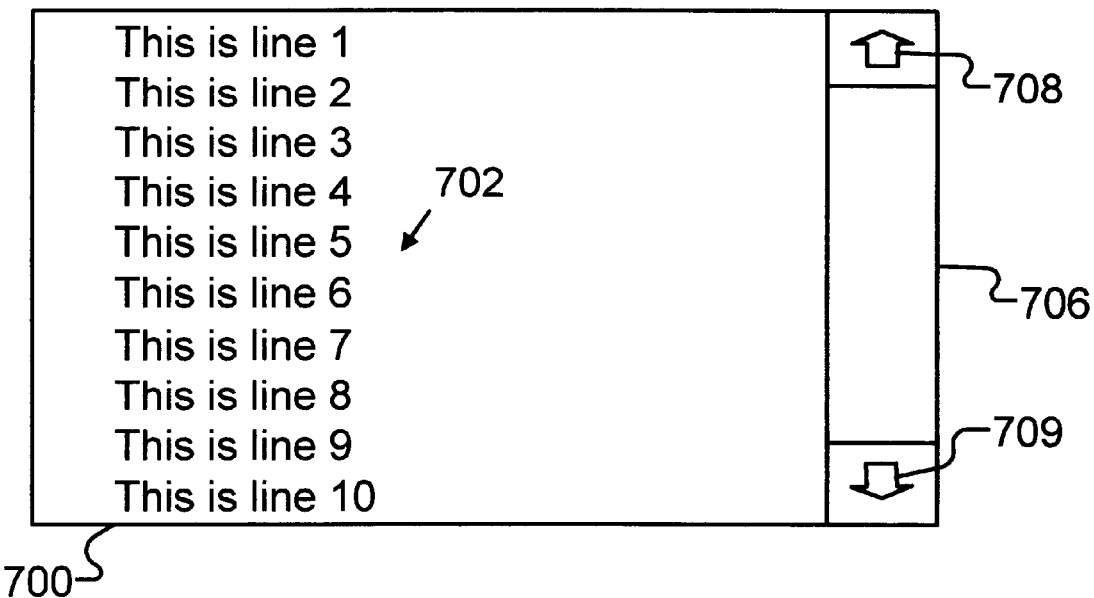
FIGS. 1A and 1B show an example of scrolling in a prior art system.
Figure 1B:
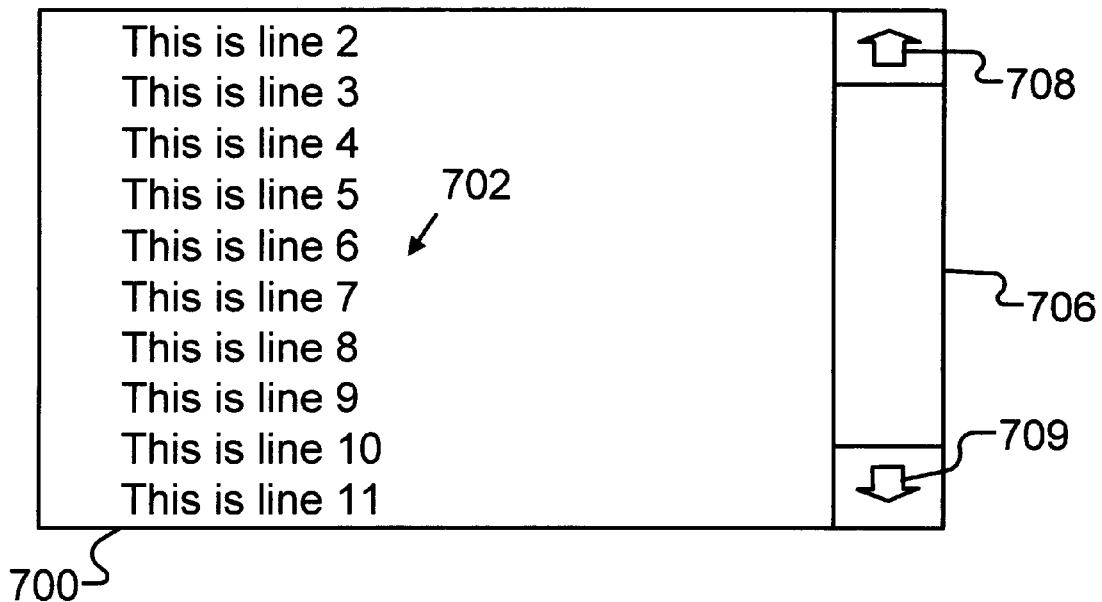

FIGS. 1A and 1B illustrate the scrolling of a text image of a prior art scrolling system. Components that are common in these two figures use the same numeral references. In FIG. 1A, a text image 702 is shown in a window 700. Image 702 contains ten lines, each starts with "This is line" and follows with a number. FIG. 1A also shows a vertical scroll bar 706 containing two scroll arrows 708 and 709. A user can click on these two arrows to scroll text image 702 upward or downward.

FIG. 1B illustrates the change in text image 702 when arrow 709 is clicked once. Specifically, a whole line is scrolled. Thus, the first line from the top in FIG. 1B is "This is line 2", which is the second line from the top of the text image shown in FIG. 1A. It can be seen from FIGS. 1A and 1B that the granularity in scrolling text image of the prior art system is one line. Under Microsoft's MS Windows, the resolution of VGA display is 640 by 480 pixels. The number of lines displayed in a full-screen window under VGA is less than fifty (for normal font size). Thus, more than ten pixels are changed in scrolling one line. The result of this rough granularity is that scrolling text images produces jerky images. Some users may find the jerky images annoying, thereby reducing their propensity to use text image-based software running under graphic user interface ("GUI") environment.

Even though only vertical scrolling is illustrated in FIGS. 1A and 1B, horizontal scrolling could be jerky if a character is scrolled at a time.

One of the reasons for the rough granularity is that many GUI-based operating systems provide line-based and character-based application program interface ("API") scrolling functions for scrolling text images. As example is the "LineScroll" function in Microsoft's Windows operating system. This function has parameters for specifying the number of lines to be scrolled vertically and the number of character positions to be scrolled horizontally. When this function is used, the vertical and horizontal scrolling have granularity of one line and one character, respectively. As a result, the text image is jerky during scrolling.

There are good reasons for programmers to use the "LineScroll" (or similar) functions. The first reason is that it is the most efficient way to scroll a text image. All a programmer needs to do is to issue a simple "LineScroll" function. The programmer does not have to write a complicated routine for displaying text in a window. The second reason is that this may be the only way to scroll certain text images. This would be the case if the format of the drawing operation of an operating system is unknown. Typically, a text image consists of alphanumerical characters in various fonts and sizes. A drawing routine needs to read the underlying text file and draw, at an appropriate window, an image showing the correct font size and formatting details. However, the size, location, and style of a display window and the font rasterizer may be controlled by the operating system. The operating system may not give a programmer sufficient information and control to write his/her own scrolling routine.

The present invention allows a programmer to scroll a text image pixel-by-pixel instead of line-by-line using commonly available GUI-based APIs. A pixel is the smallest unit of display. Thus, this scrolling method represents the finest granularity in scrolling.

Figure 2:
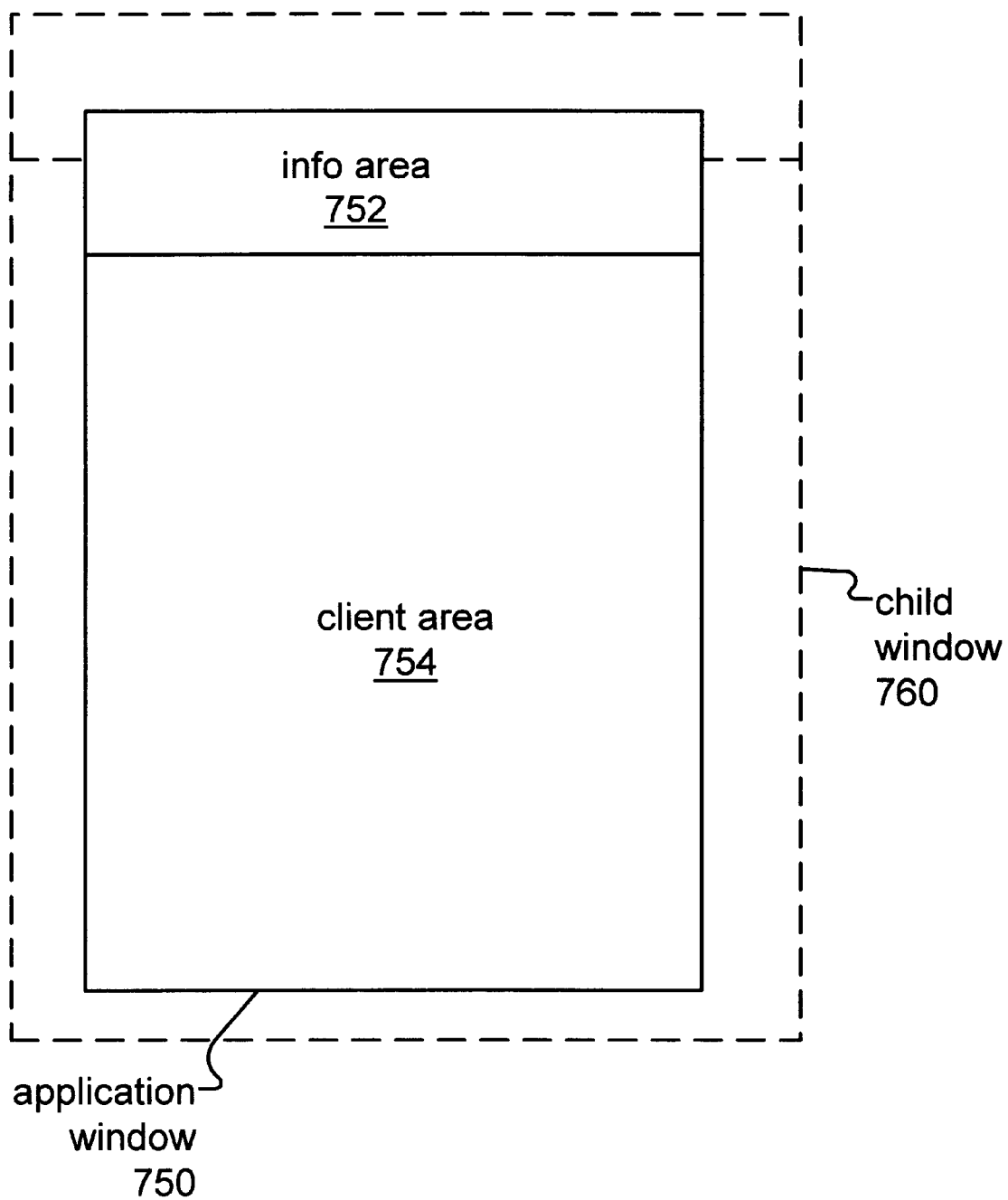
FIG. 2 shows the relationship between an application window and a child window of the present invention.

FIG. 2 is a schematic diagram showing the scrolling operation of the present invention. It shows an application window 750 comprising an information area 752 and a client area 754. Information area 752 is generated by the operating system, and typically contains the title, menu bar, and tool bar related to the window. Client area 754 is used to display information provided by the programmers and users. For example, the above-described text image could be displayed on client area 754

FIG. 2 also shows a child window 760. This window has a client area that is slightly larger than client area 754 of application window 750. Windows 760 and 750 are arranged such that only the portion of child window 760 overlapping client area 754 of application window 750 is displayed on a computer screen, In the present invention, the text image is drawn on the client area of child window 760 instead of application window 750. Client area 754 of application window 750 merely serves as a frame for allowing a user to see the portion of text image within this frame.

The text image 702 of FIGS. 1A and 1B is again used to illustrate the present invention. Text image 702 is drawn on child window 760. Initially, it is arranged such that the first line, i.e., the line "This is line 1", appears at the top of client area 754 of application window 750. Child window 760 is then caused to move up, one pixel at a time. Under MS Windows, this can be accomplished using a "MoveWindow" API function. Because only the portion of child window 760 enclosed by client area 754 of application window 750 is displayed on the computer screen, text image 702 appears to scroll upwards pixel by pixel (instead of line by line). When child window 760 has moved up by one full line (i.e., the line "This is line 1" would disappear from the computer screen), it clears itself immediately and re-draws itself at the original position. At the same time, a "LineScroll" Windows API function is invoked to scroll one line. As a result, the line "This is line 2" would replace the line "This is line 1". Because child window 760 is back to its original position, this line appears at the top of client window 754 of application window 750. If further scrolling is desired, child window 760 moves up again pixel by pixel.

The size of child window 760 is determined from the following considerations: (1) Child window 760 may need to move up one line or down one line before returning to its original position. Thus, child window 760 should be larger than application window 750 by at least two lines vertically if vertical scrolling is desired. (2) Child window 760 may need to scroll to the left by one character and to the right by one character before returning to its original position. Thus, child window 760 should be larger than application window 750 by at least two characters horizontally if horizontal scrolling is desired.

Figure 3:
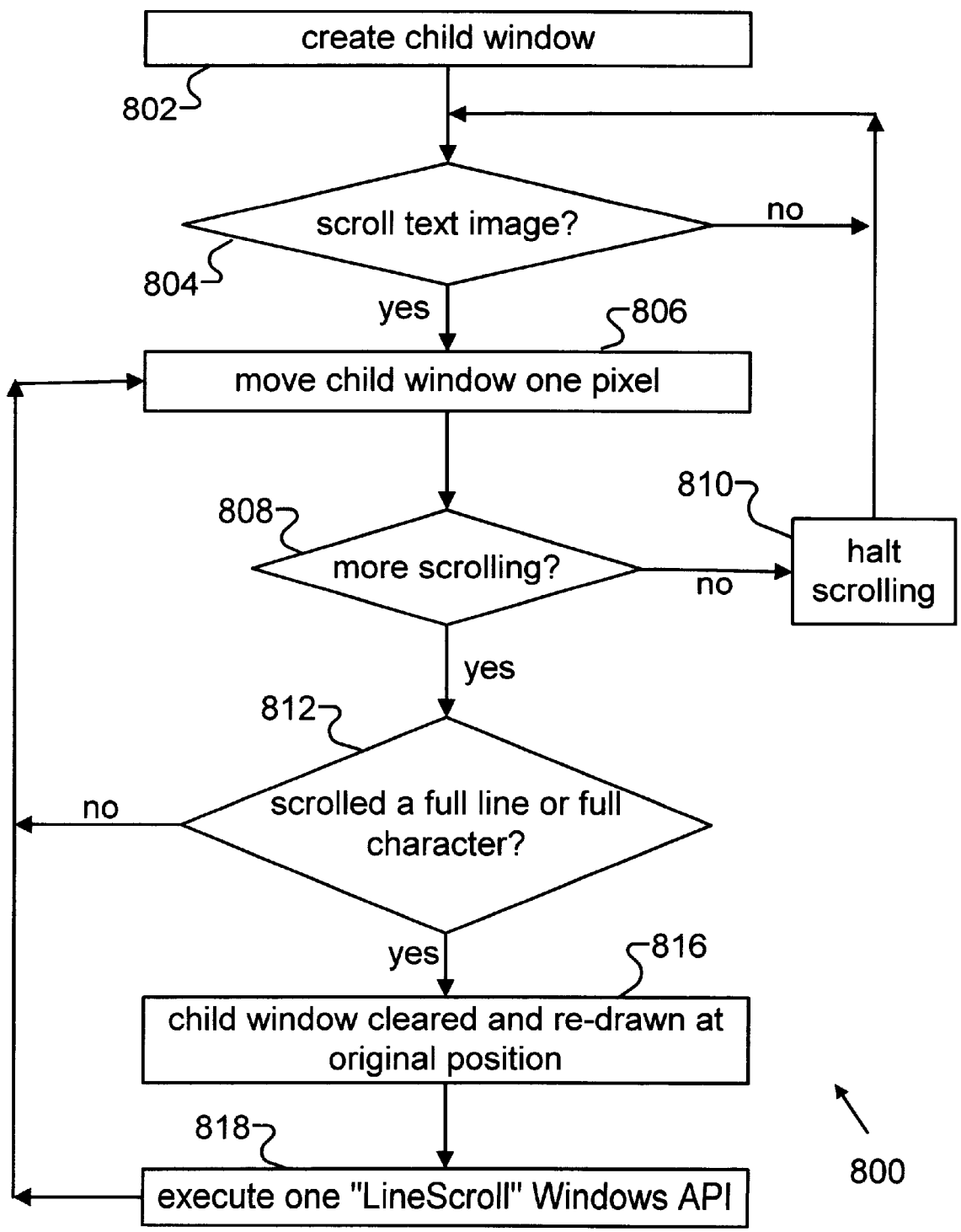
FIG. 3 is a flow chart showing the scrolling operation of the present invention.

FIG. 3 is a flow chart 800 showing the above described steps. In step 802, a child window is created by the present scrolling system at appropriate location on a computer screen This location must be coordinated with the location of the application window so that appropriate portion of the text image appears inside the application window. In step 804, the operating system and application software determine whether the user desires to scroll the text image. If the answer is negative, step 804 branches back to itself to wait until the user desires scrolling. If the answer is positive, flow chart 800 branches to step 806 where the child window is moved one pixel in accordance with a scrolling direction desired by the user. At step 808, flow chart 800 determines whether the user desires more scrolling. If the answer is negative, scrolling is halted (step 810). Flow chart 800 branches back to step 804 and wait for further action by the user. If the answer is positive, flow chart 800 determines whether a full line (for vertical scrolling) or a full character (for horizontal scrolling) has been scrolled (step 812). If the answer negative, flow chart branches back to step 806 (i.e., scroll one more pixel). If the answer is positive, flow chart branches to step 816 where the child window clears itself and then redraws itself at the original position. The text image is scrolled using a line-based or character-based scrolling API function (step 818). Flow chart 800 branches to step 806 where scrolling is again performed one-pixel at a time.

In an alternative embodiment, a different operation could be performed at step 816. The child window could be moved rapidly back to its original position, and either simultaneously or at about the same time, step 818 (i.e., scroll one line) is executed. Thus, instead of a "clear and re-draw", step 816 becomes a "move" performed rapidly.

It can be seen from the above description that pixel-by-pixel scrolling can be performed using APIs typically available in a GUI-based operating environment. As a result, programming can be accomplished easily. Because scrolling is performed a pixel at a time (instead of a line or a character at a time), the movement of the text image is very smooth.

It should be noted that the number of lines shown in FIGS. 1A and 1B is for illustrative purposes only. A text image could contain any number of lines each having any number of characters. The APIs used in the above examples are also for illustrative purposes only.

The invention has been described with reference to a specific exemplary embodiment thereof Various modification and changes may be made thereunto without departing from the broad spirit and scope of the invention. The specification and drawings are, accordingly, to be regarded in an illustrative rather than a restrictive sense; the invention is limited only by the provided claims.

We claim:

1. A scrolling system for a user to scroll a text image containing alphanumeric characters that are generated by a computer system from a text-based file, said computer system containing means for generating display windows on a monitor and for scrolling said text image at a granularity defined by said alphanumeric characters, said scrolling system comprising:

means for generating, on said monitor, a first display window having a blank client area;

means for generating, on said monitor, a second display window having a client area that is larger than said client area of said first window;

means for positioning said client area of said second window such that said client area of said first window is positioned completely within said client area of said second window;

said second window being blocked from displaying on said computer monitor except for a portion of its client area which overlaps said client area of said first window;

means for drawing a first text image from said text-based file on said client area of said second window;

means for moving said second window from a starting location in a direction desired by said user, thereby displaying different portions of said text image on said computer monitor during moving;

means for returning said second window to said starting location when said text image has been moved a distance corresponding to said granularity; and means for drawing a second text image from said text-based file on said client area of said second window such that said first and said second images differ by said granularity.

2. The system of claim 1 wherein said client area of said second window is larger than said client area of said first window by at least one character vertically.

3. The system of claim 1 wherein said client area of said second window is larger than said client area of said first window by at least one character horizontally.

4. The system of claim 1 wherein said second window is a child window of said first window.

5. The system of claim 1 wherein said means for moving moves said second window a pixel at a time.

* * * * *